R. LINN.
ANTIFRICTION BEARING.
APPLICATION FILED MAY 16, 1908.

1,001,764.

Patented Aug. 29, 1911.

Witnesses:
Sburt Beans
A. W. Fenstemaker

Inventor:
Robert Linn,
By Glenn S. Noble
Att'y.

UNITED STATES PATENT OFFICE.

ROBERT LINN, OF CHICAGO, ILLINOIS.

ANTIFRICTION-BEARING.

1,001,764.  Specification of Letters Patent.  Patented Aug. 29, 1911.

Application filed May 16, 1908. Serial No. 433,283.

*To all whom it may concern:*

Be it known that I, ROBERT LINN, a citizen of the United States, residing at Chicago, in the county of Cook and State of Illinois, have invented certain new and useful Improvements in Antifriction-Bearings, of which the following is a specification.

This invention relates more particularly to means for reducing the friction in the bearings of wheels of various kinds, as for instance, vehicle wheels, trolley wheels, pulleys, or the like, or bearings for shafting of various kinds; and also means for taking up the end thrust of shafting or other similar devices. Its objects are to provide an antifriction bearing in which all of the movement between the various parts will be in the nature of a rolling or revolving motion so that there will be little or no sliding action between any of the movable parts.

To this end it consists in the combination with a stationary member, as for instance an axle, of rotatable balls or similar devices for carrying the load, other rotatable balls or members interposed between said load-carrying balls for the purpose of preventing said load-carrying balls from coming in contact with each other, means for holding said spacing balls in proper position, a hub or the like having suitable runways for engagement with said load-carrying balls, and such other novel features as will be pointed out and described hereinafter. However, it will also be noted that the arrangement of these parts may be greatly varied without departing from the spirit of this invention.

I have shown an embodiment of this invention in the accompanying drawings, in which—

Figure 1:
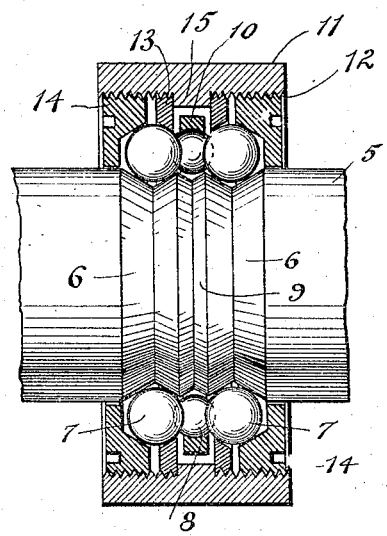
Figure 2:
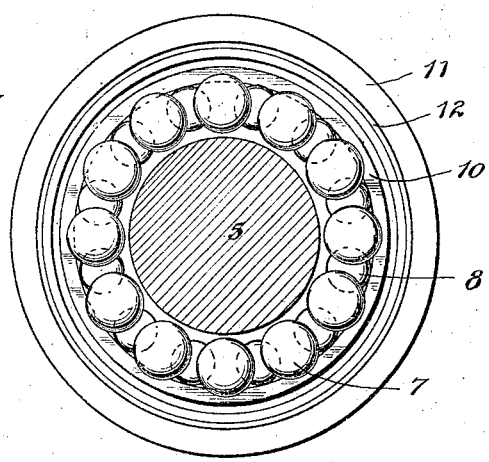
Figure 3:
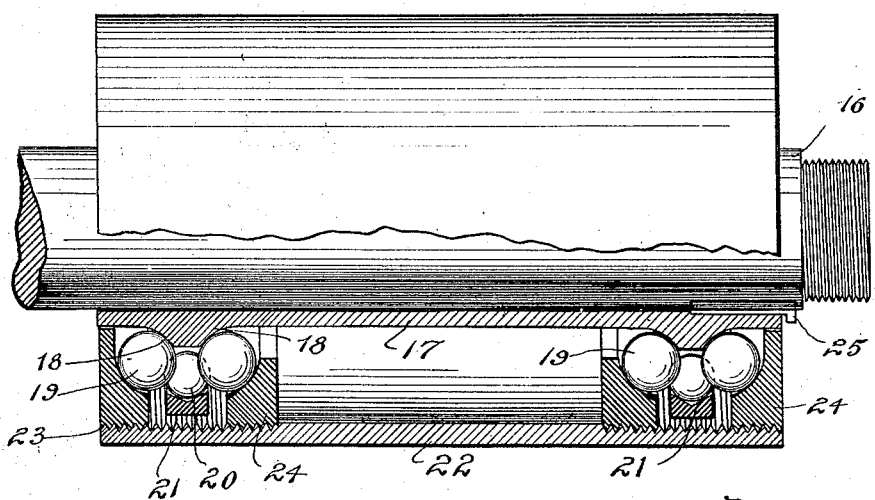

Figure 1 is a sectional elevation of my improved bearing shown as applied to a solid shaft; Fig. 2 is a sectional end view of the same, parts being removed for convenience in illustration; Fig. 3 is a side view, partly in section, showing a modified form; and Fig. 4 is a diagrammatic view illustrating the underlying principle of this invention.

Figure 4:
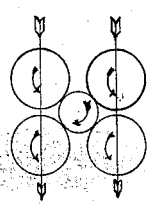

As shown in Fig. 4, it will be noted that when four balls, for instance, are held or guided in pairs in grooves for parallel movement, these balls may be prevented from engaging with one another by means of a fifth ball interposed between the first-named balls, and all of said first-named balls will tend to rotate the fifth ball in the same direction, so that there will be no sliding movement between any of these balls. It will also be noted that the contact with the fifth ball will tend to continually change the direction of rotation of the first four balls, so that these balls will be worn evenly. In order to take advantage of this arrangement, the parts may be arranged in different ways. As shown in Figs. 1 and 2, 5 represents an axle or shaft having grooves 6 therein serving as runways for the balls 7. These grooves are arranged at a suitable distance apart so that the series of balls 7 are separated longitudinally of the shaft, and spacing balls 8 are then introduced between the respective pairs of load-carrying balls 7 in order to prevent said load balls from coming in contact with each other. These spacing balls are preferably arranged with their centers about in line with the centers of the balls 7, that is at about the same distance from the center of the shaft 5; but this arrangement is not essential, as these balls may be either farther away from the shaft or closer thereto and still perform their main function of keeping the larger balls separated. In the arrangement shown in these figures, the balls 8, when in normal operation, will not touch the shaft 5, as the centrifugal force will carry them out and away from said shaft. However, the shaft may be provided with a groove 9 for holding said balls when the wheel is stopped and also for assistance in assembling. The series of balls 8 are held in normal position by means of a ring 10 which is preferably grooved on the inner side for engagement with said balls, this ring being a floating ring and not intended to contact with any other parts of the bearing. The hub or bearing portion of the wheel is indicated at 11, and is threaded on the inside as indicated at 12, to receive the outer bearing rings or cup rings 13 and 14 which engage with the balls 7. The hub or sleeve 11 is preferably shouldered at 15 to form a stop for the bearing rings 13, so that these rings may be readily screwed into position without danger of coming in contact with the floating ring 10. The outer bearing rings 14 are adapted to be adjusted for assembling and also to take up any wear, and when so adjusted may be secured in position by any suitable means. These outer rings are also provided with inwardly-projecting flanges which come sufficiently close to the axle 5 to prevent dirt from getting into the bearing.

The bearing just described is adapted to be used for small wheels and where there is a limited amount of room for the bearing; but for large vehicles or for large wheels, two or more of these ball systems may be combined in one bearing, such an arrangement being shown in Fig. 3. In this instance the shaft or axle 16 is not grooved but is provided with a sleeve 17 having thereon ball races 18 for the balls 19. These balls are prevented from coming in contact with each other, by means of the spacing balls 20 which are held in position by means of a ring 21, but in this instance the centers of the spacing balls are somewhat beyond the centers of the bearing balls and the ring 21 is made sufficiently heavy to withstand a certain amount of thrust from the balls 19 against the balls 20. The hub or outer bearing member is indicated at 22, and this may be made in the form of a sleeve or cylinder which is adapted to fit within the hub or central portion of a wheel to form the bearing. This sleeve is threaded at 23 to receive the bearing rings or cup rings 24 which are adapted to engage with the balls 19. It will be noted that in this instance there is only one of such rings for each set of balls, instead of two rings as above described. In this arrangement there is probably a greater outward thrust against the balls 20, and for this reason I have shown the retaining ring 21 as being somewhat stronger in order to withstand such thrust. The bearings at either end of the hub may be adjusted by means of the outer cup ring 24, and this ring may then be secured in position in any desired manner. It will also be noted that the entire bearing may be assembled in the wheel, as for instance in a vehicle wheel, and then fitted onto the axle 16, and the sleeve 17 secured in position in any desired manner, as for instance, by means of a key 25.

It will be noted that this form of bearing not only provides for lessening the friction between a part rotating within or upon another member, but also provides means for taking up the end thrust of a shaft or the like. For instance, with the arrangement shown in Fig. 1, a shaft, such as indicated at 5, when supported in a bearing of the character shown, would be prevented from lateral movement, and if the end thrust of such a shaft was of considerable amount, a number of such bearings could be arranged along the shaft. Or, as shown in Fig. 3, the lateral movement of a wheel is prevented by means of the bearing shown.

Having thus described my invention, what I claim and desire to secure by Letters Patent is:

1. In a bearing, the combination of a grooved shaft, balls adapted to engage with said grooves, spacing balls interposed between said first-named balls for holding the same apart, each of said spacing balls engaging with four of said first-named balls, a floating ring engaging with said spacing balls, a casing or hub having an inwardly-projecting shoulder, bearing rings secured in said casing and resting against said shoulder, and adjustable bearing rings also secured in said casing and adapted to coact with said first-named bearing rings to form a support for said casing on said balls.

2. In a bearing, the combination of a bearing member having adjacent raceways, a series of balls engaging with one of said raceways, a second series of balls engaging with the other raceway, a third series of balls interposed between the first two series, each ball of said third series being adapted to engage with four of the balls in said raceways, a grooved ring engaging with the balls of said third series and serving to hold them from being thrust outwardly, an outer bearing member, inwardly projecting bearing rings 13 secured in said outer bearing member, one of said rings being adapted to engage with the balls of the first series and the other ring being adapted to engage with the balls of the second series, and inwardly projecting cups 14 secured in said outer bearing member, one of said cups being adapted to engage with the balls of the first series and the other cup, with the balls of the second series.

ROBERT LINN.

Witnesses:
WM. E. HAMILTON,
A. W. FENSTEMAKER.